United States Patent
Hayashi et al.

(10) Patent No.: US 7,850,484 B2
(45) Date of Patent: Dec. 14, 2010

(54) CONNECTING APPARATUS FOR CONNECTING TO AN ELECTRONIC APPARATUS

(75) Inventors: Toyofumi Hayashi, Hamamatsu (JP);
Kenshiro Tanaka, Sayama (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 12/547,990

(22) Filed: Aug. 26, 2009

(65) Prior Publication Data
US 2010/0055964 A1 Mar. 4, 2010

(30) Foreign Application Priority Data
Aug. 28, 2008 (JP) .............................. 2008-220520

(51) Int. Cl.
*H01R 13/60* (2006.01)
(52) U.S. Cl. ................. 439/529; 439/929; 248/309.1
(58) Field of Classification Search ................. 439/529, 439/929; 248/309.1
See application file for complete search history.

(56) References Cited

U.S. PATENT DOCUMENTS

| | | | | |
|---|---|---|---|---|
| 6,171,127 | B1* | 1/2001 | Hebblewhite et al. | 439/341 |
| 7,381,075 | B2* | 6/2008 | Gontarek et al. | 439/341 |
| 2006/0145039 | A1* | 7/2006 | Shawver | 248/309.1 |
| 2007/0035913 | A1* | 2/2007 | Gloede et al. | 361/600 |

FOREIGN PATENT DOCUMENTS

| | | |
|---|---|---|
| JP | 2004-135119 A | 4/2004 |
| JP | 2007-96883 A | 4/2007 |
| JP | 2008-166951 A | 7/2008 |

* cited by examiner

*Primary Examiner*—Tho D Ta
(74) *Attorney, Agent, or Firm*—Crowell & Moring LLP

(57) ABSTRACT

There is provided a connecting apparatus for connecting to an electronic apparatus including a connector, the connecting apparatus including: a body that includes a base portion and a back portion substantially perpendicular to each other so as to define a holding space for holding the electronic apparatus; a connector provided on the base portion, and to be connected with the connector of the electronic apparatus; and a positioning unit which adjusts the electronic apparatus to a predetermined position with respect to the base portion in a state where the connector of the electronic apparatus is connected to the connector of the connecting apparatus.

18 Claims, 9 Drawing Sheets

CONNECTING APPARATUS FOR CONNECTING TO AN ELECTRONIC APPARATUS

BACKGROUND OF THE INVENTION

1. Technical Field

The present invention relates to a connecting apparatus to which an electronic apparatus such as a mobile phone, a portable music player, a digital camera, or a PDA (personal digital assistant) is connected.

2. Background Art

Cradles on which portable electronic apparatuses are placed for charging secondary batteries housed in the portable electronic apparatuses and performing transmission and reception of data into and from memories equipped in the portable electronic apparatuses have been known.

For example, to cite portable music players, there exist even in one series a plurality of apparatuses different in shape (outside dimensions) due to model changes, etc., of the products. For this reason, cradles that suit the shapes of the apparatuses have also been required. Therefore, cradles improved in user convenience by making it possible to place thereon even portable music players of different shapes to be thereby made usable in common so as to improve versatility have been known.

Here, for the cradle described in JP-A-2007-96883, a plurality of attaching portions that enable individually attaching electronic apparatuses different in size are prepared, and the attaching portions are made replaceable with respect to the cradle body. In addition, the cradle described in JP-A-2008-166951 has a mechanism for positioning in the left and right direction and the front and rear direction of the placing portion according to the electronic apparatus. Further, the cradle described in JP-A-2004-135119 has a mechanism for making the position of the connector on the cradle displaceable.

Meanwhile, in JP-A-2007-96883, the attaching portion must be prepared for every shape in order to correspond to portable electronic apparatuses different in shape. In JP-A-2008-166951, positioning must be performed in the width direction and the thickness direction of the portable electronic apparatus. Either cradle causes a user to feel bothered.

On the other hand, in JP-A-2004-135119, the connector on the portable electronic apparatus and the displaceable connecting portion (connector) on the cradle are only connected, and the portable electronic apparatus is not fixed to the cradle body. For this reason, there is a possibility that the connector comes off and the connecting portion (connector) may be damaged due to an unreasonable load applied to the portable electronic apparatus.

SUMMARY OF THE INVENTION

The present invention has been made in view of the aforementioned background, and an object thereof is to provide a connecting apparatus that can be commonly used even for an electronic apparatus different not only in external form but also in thickness. Further, it is another object to provide a connecting apparatus that can reliably connect connectors to each other.

In order to solve the above-mentioned object, or another object, there is provided a connecting apparatus for connecting to an electronic apparatus including a connector, the connecting apparatus including: a body that includes a base portion and a back portion substantially perpendicular to each other so as to define a holding space for holding the electronic apparatus; a connector provided on the base portion, and to be connected with the connector of the electronic apparatus; and a positioning unit which adjusts the electronic apparatus to a predetermined position with respect to the base portion in a state where the connector of the electronic apparatus is connected to the connector of the connecting apparatus.

For the connecting apparatus according to the present invention, the positioning unit regulates an electronic apparatus to a predetermined position to enable connection to the connecting apparatus. Thus even an electronic apparatus different not only in external form but also in thickness can be adjusted to a predetermined position to be connected with the connecting apparatus. This makes it possible to use the connecting apparatus in common even for an electronic apparatus different not only in external form but also in thickness.

Moreover, because the electronic apparatus connected to a connecting apparatus is regulated to a predetermined position with respect to the base portion besides a connection of the connectors to each other, the connectors are reliably connected to each other, and application of an unnecessary load to the connectors is prevented so that damage to the connectors can also be prevented. Moreover, reliability of the connecting apparatus can be improved.

DETAILED DESCRIPTION OF THE PREFERRED EMBODIMENTS

Hereinafter, an exemplary embodiment of a connecting apparatus according to the present invention will be described.

<General Construction of Connecting Apparatus>

Figure 1:
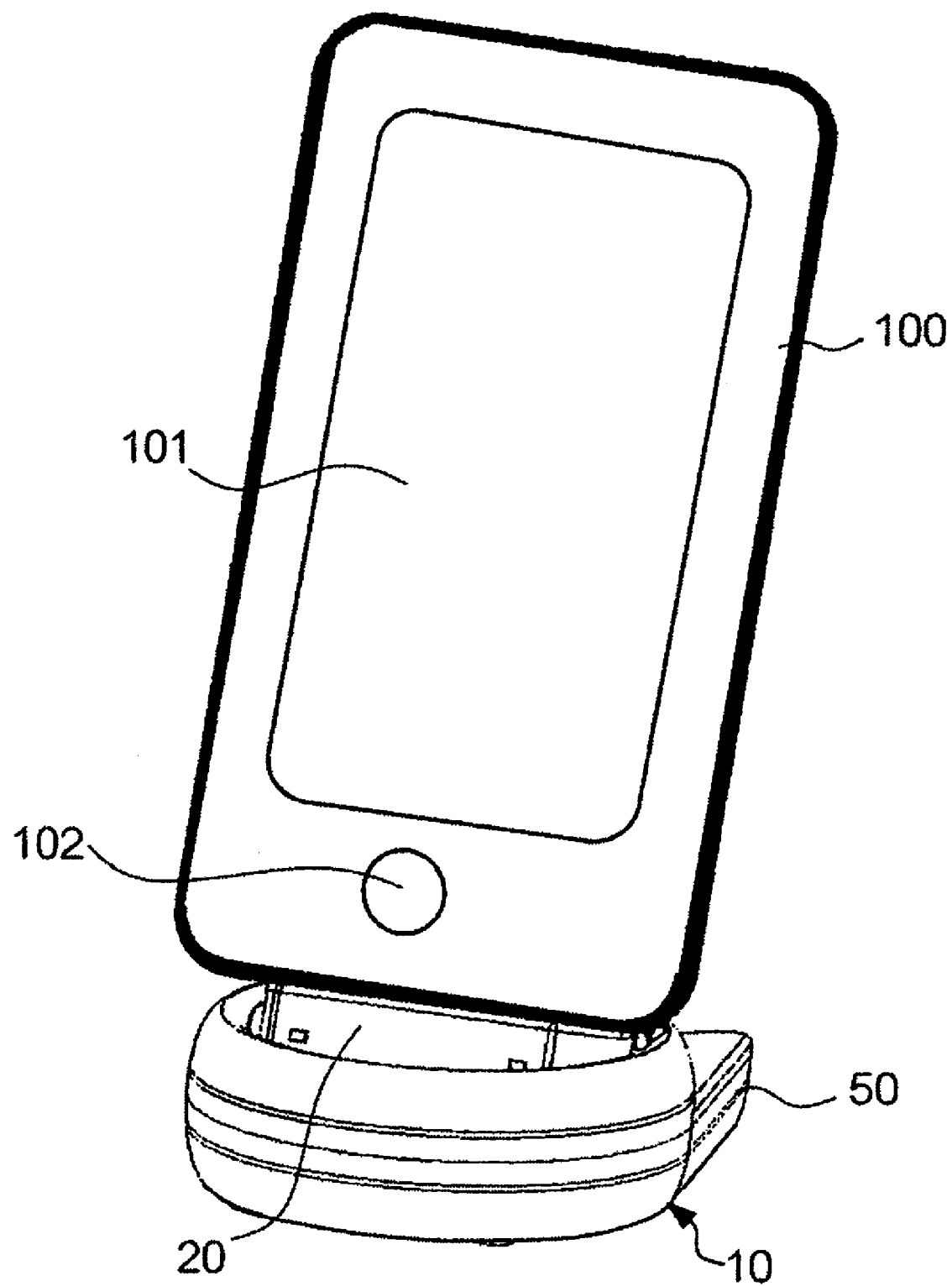
FIG. 1 is a perspective view showing a state where a portable electronic apparatus is connected to and placed on an attachment according to an embodiment.
Figure 2:
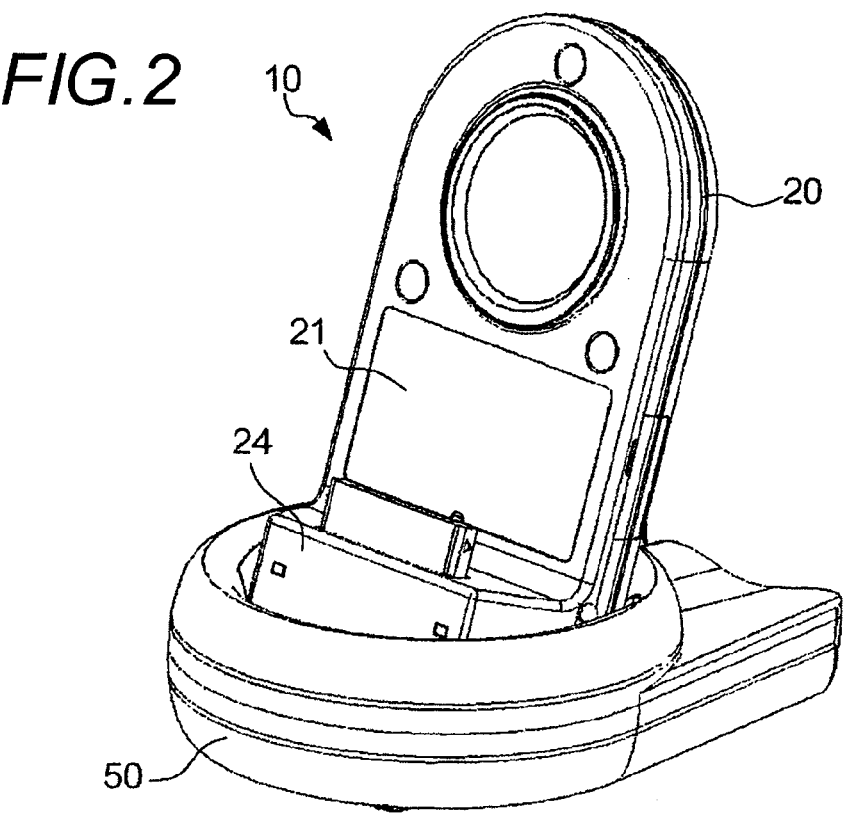
FIG. 2 is a perspective view showing the attachment according to the embodiment.

FIG. 1 is a perspective view showing a state where a portable electronic apparatus 100 is connected to a connecting apparatus according to the present embodiment and these are further placed on a stand 50, and FIG. 2 is a perspective view showing a state where a connecting apparatus is placed on a stand 50 according to the present embodiment. In the present embodiment, description will be given on the assumption that a portable music player 100 (hereinafter, referred to as a "player 100") is connected as a portable electronic apparatus to a connecting apparatus, and the player 100 and connecting apparatus thus connected are placed on the stand 50.

As shown in FIG. 1 and FIG. 2, an attachment 10 includes a holder 20 to serve as a connecting apparatus body to which a player 100 is connected and a stand 50 that supports the holder 20 in a vertically/horizontally mounted state. The player 100 is formed in a rectangular plate shape as its external shape, arranged on the surface with a touch panel-type display portion 101 and a manipulator 102, and provided with an apparatus-side connector 103 (shown in FIG. 9) in the central portion of the short side and in the central portion in the thickness direction.

<Construction of Holder 20 (Connecting Apparatus Body)>

Figure 3:
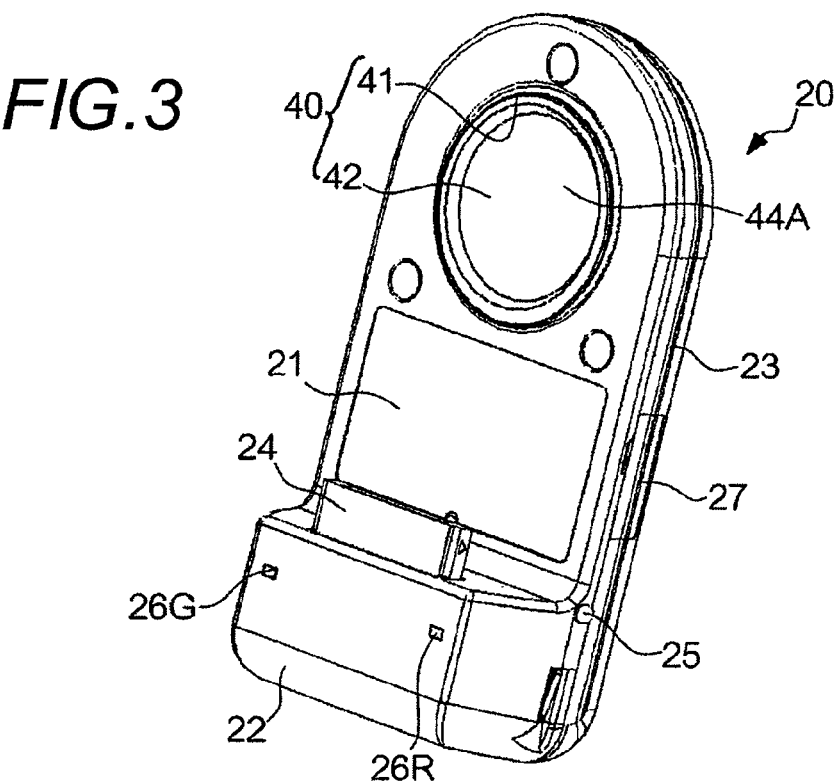
FIG. 3 is a perspective view showing a holder (connecting apparatus body) according to the embodiment.
Figure 4:
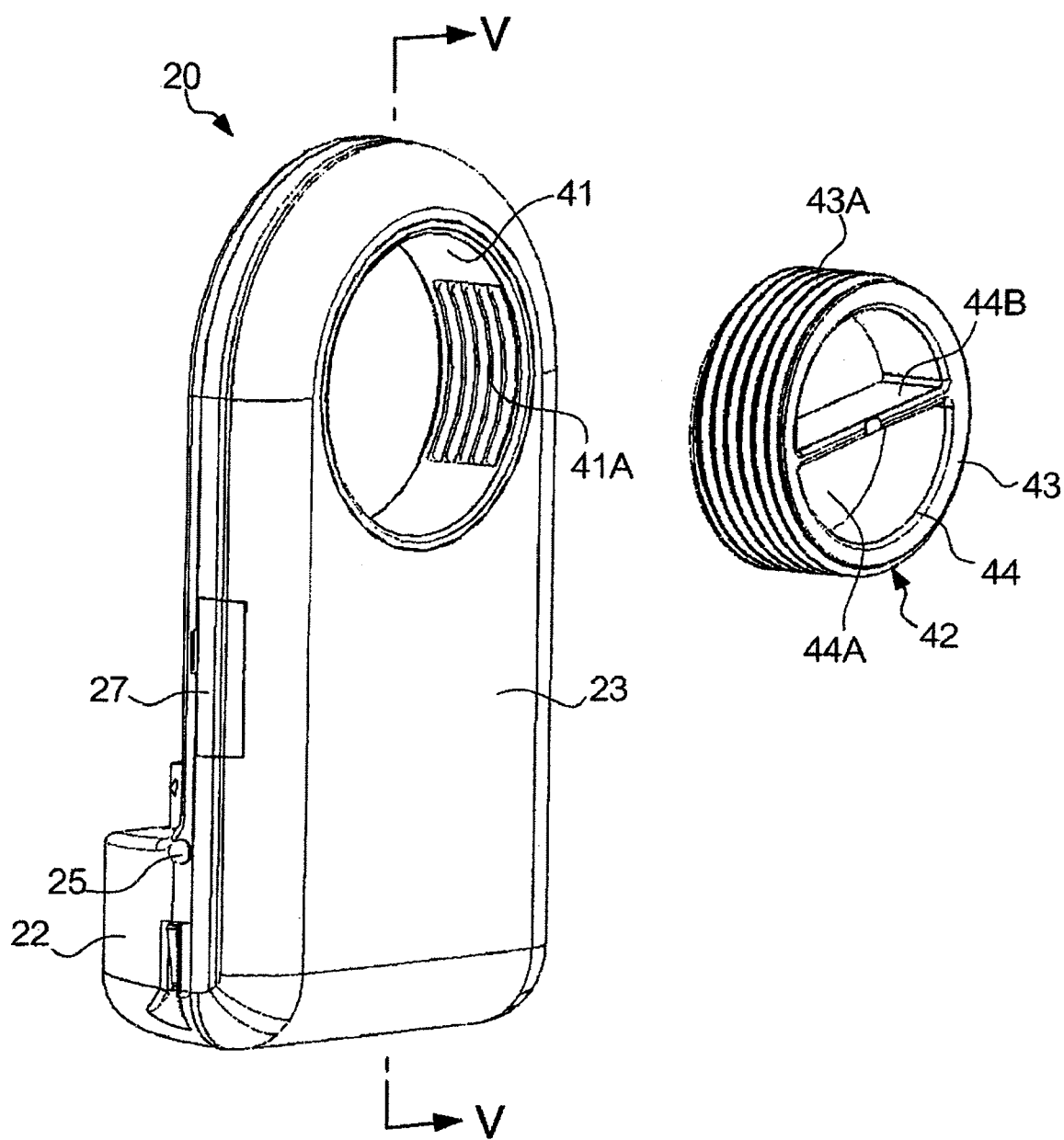
FIG. 4 is a perspective view showing the holder and a press-contact screw according to the embodiment.
Figure 5:
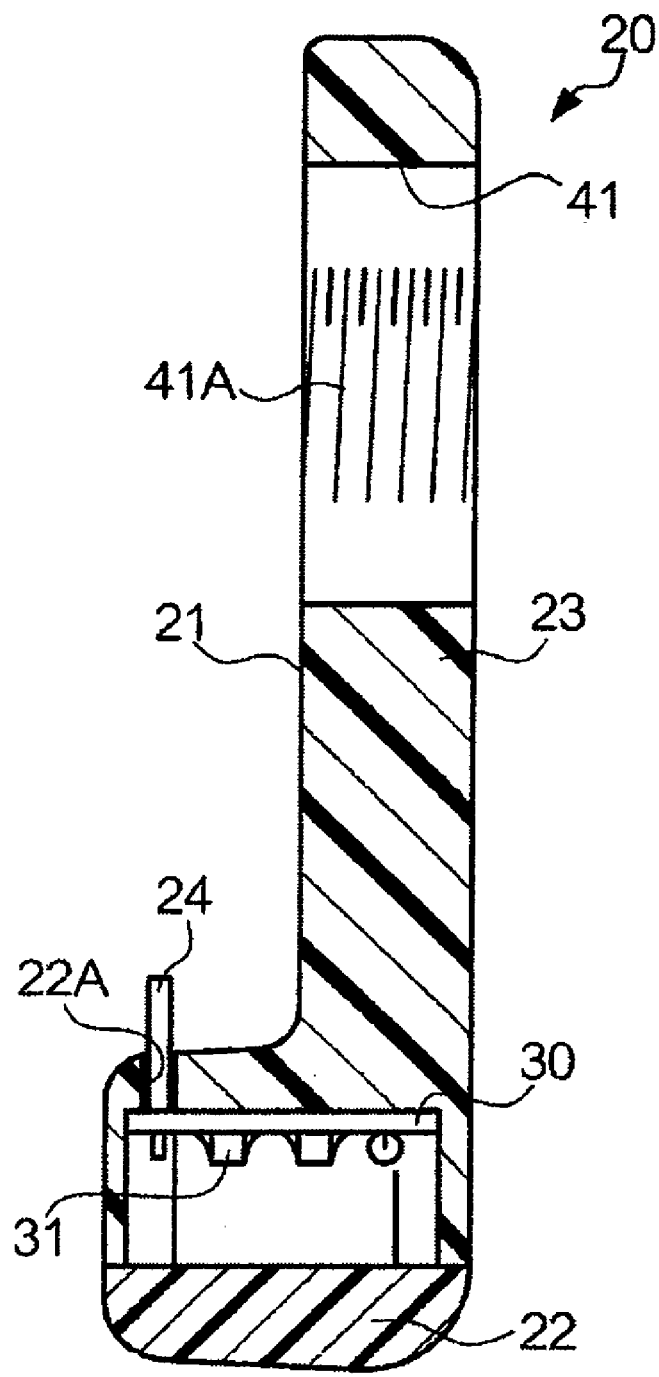
FIG. 5 is a sectional view taken from an arrow direction V-V in FIG. 4.
Figure 6:
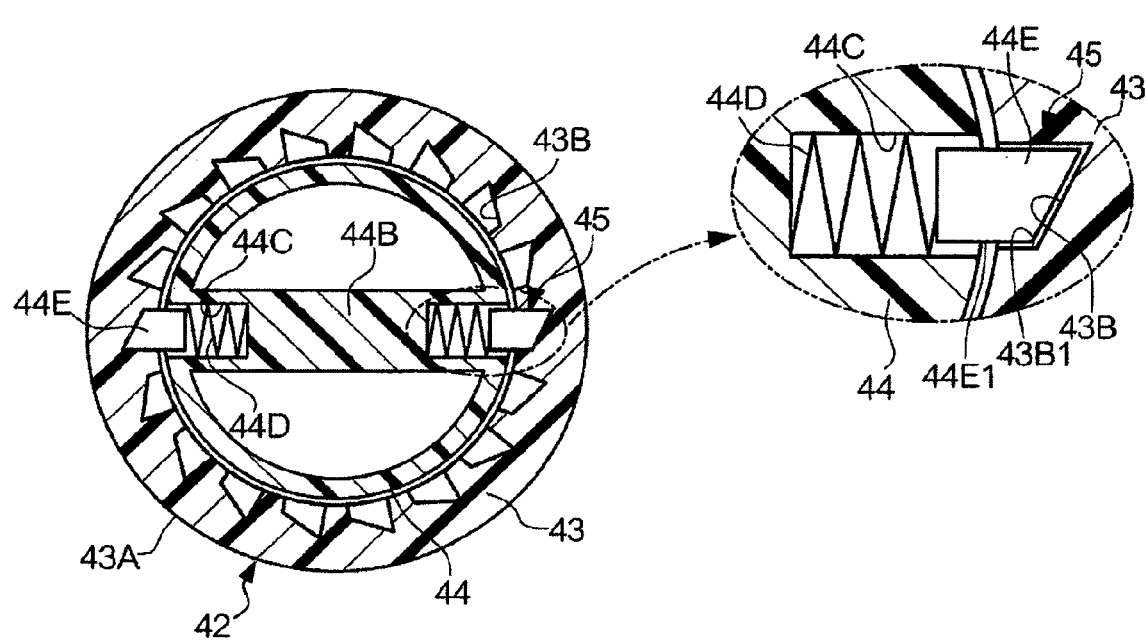
FIG. 6 is a sectional view showing the clutch mechanism (screwing restricting unit) according to the embodiment.

Next, description will be given of a construction of the holder 20. FIG. 3 is a perspective view showing the holder 20, FIG. 4 is a perspective view showing the holder 20 and a press-contact screw 42, FIG. 5 is a sectional view taken from an arrow direction V-V in FIG. 4, and FIG. 6 is a sectional view showing a screwing restricting unit.

The holder 20 is formed of a resin material (for example, an ABS resin) substantially in the shape of a letter "L" in the cross-sectional direction, whose shorter side serves as a base portion 22, whose longer side serves as a back portion 23, and whose bent inner side serves as a placing portion (a holding space) 21 to and on which the player 100 is connected and placed. Further, in the holder 20, a positioning mechanism 40 to be described later is provided.

On the base portion 22, a male-type holder-side connector 24 extending in the same direction as the back portion 23 is provided in a projecting manner. The holder-side connector 24, as shown in FIG. 5, projects toward the placing portion 21 via a connector hole 22A formed in the base portion 22 and mounted on a substrate 30 built in the base portion 22, and thus the holder-side connector 24 is strongly fixed to the base portion 22.

The substrate 30 is mounted with an electronic element 31, and in the present embodiment, a wireless transmission circuit is constituted by the electronic element 31. The wireless transmission circuit transmits data stored in a memory of the player 100 connected via an apparatus-side connector to the holder-side connector 24 to an external apparatus (for example, a speaker and the like) by wireless communication. In addition, if there is no external power feeding to the holder 20, the wireless transmission circuit is driven by using electric power of a secondary battery housed in the player 100.

The back portion 23, as shown in FIG. 3 and FIG. 4, is formed in a plate shape extending from the base portion 22 in a substantially perpendicular direction, and in conjunction with the base portion 22, the inner side thereof forms a part of the placing portion 21.

Moreover, at joint parts between the base portion 22 and the back portion 23 of the bilateral side surfaces of the holder 20, receiving terminals 25 (only one is shown) to which feeding terminals on the stand 50 are electrically connected are provided in an exposed manner in a state where the stand 50 is attached. A green LED 26G and a red LED 26R connected to the substrate 30 are provided at the front surface of the base portion 22. A concealing cover 27 is formed at a side surface of the back portion 23, and a receiving connector to which a connector to be directly fed with power from a charging adapter via a lead (neither is shown) is connected is concealed in the concealing cover 27.

<Construction of Positioning Mechanism 40>

Next, a description will be given of the positioning mechanism 40 according to the present embodiment.

The positioning mechanism 40 includes a screw hole 41 opened in the back portion 23, a press-contact screw 42 to be screwed into the screw hole 41, and a clutch mechanism 45 for restricting the press-contact screw 42 from being screwed more than regulated degree. The positioning mechanism 40 adjusts the player 100 into a substantially perpendicular state with respect to the base portion 22 in a state where the apparatus-side connector 103 is connected to the holder-side connector 24. Concretely, the player 100 is vertically held with respect to the base portion 22, and then adjusted until a press-contact portion 44A of the press-contact screw 42 is pressed to contact the back surface of the player 100.

Moreover, for the screw hole 41, as shown in FIG. 4, a female screw portion 41A is formed at a part of the inner circumferential surface.

The press-contact screw 42 is formed with a male screw portion 43A at its outer circumferential surface. Further, the press-contact screw 42 includes, as shown in FIG. 6, an outer cylinder 43 formed at its inner circumferential surface with an engagement teeth row 43B, an inner cylinder 44 concentrically formed while being retained on the outer cylinder 43, and a clutch mechanism 45 for restricting a rotation of the inner cylinder 44 from being transmitted to the outer cylinder 43.

<Construction of Clutch Mechanism 45 (Screwing Restricting Unit)>

The clutch mechanism 45 generally includes the engagement teeth row 43B formed on the outer cylinder 43 and engagement claws 44E, 44E to be engaged with the engagement teeth row 44B.

Here, the inner cylinder 44 has the press-contact portion 44A for which one of the opening portions is blocked and a diametrically extending handle portion 44B from the press-contact portion 44A toward the other end. Further, at both sides of the handle portion 44B of the inner cylinder 44, formed as shown in FIG. 6 are housing holes 44C each having a rectangular shape in section opened to the outer circumferential side, and an urging spring 44D and the engagement claw 44E are inserted in the housing hole 44C.

The engagement claw 44E is formed in a tooth form having at its tip a right-angled triangular shape whose hypotenuse is inclined in a clockwise direction, and the engagement teeth row 44E also has a trapezoidal tooth form with which the engagement claw 44E is engaged. As a result of the engagement teeth row 43B being formed in a trapezoidal tooth form, in a state where the engagement claw 43E is engaged with a tooth of the engagement teeth row 43B, an upper base 43B1 of the part to be a trapezoid is engaged with a side portion 44E1 of the engagement claw 44E, so that a rotation of the inner cylinder 44 is reliably transmitted to the outer cylinder 43.

Also, it may be a shape to engage only the tip part formed in a right-angled triangular shape of the engagement claw 44E, without forming the upper base 43B1 in the tooth form of the engagement teeth row 43B.

In the clutch mechanism 45 constructed as such, when the handle portion 44B of the inner cylinder 44 is pinched and rotated in a clockwise direction, the engagement claw 44E is engaged with one tooth form of the engagement teeth row 43B to transmit a rotation of the inner cylinder 44 to the outer cylinder 43 in a state where no load has been applied to the outer cylinder 43. On the other hand, when a load is applied to the outer cylinder 43, because of the shapes of the engagement claw 44E and the engagement teeth row 43B, the engagement claw 44E is pushed into the housing hole 44C against a spring force of the urging spring 44D, and the engagement claw 44E is disengaged from the tooth form of the engagement teeth row 43B, so that transmission from the inner cylinder 44 to the outer cylinder 43 is avoided.

And, in the positioning mechanism 40, by pinching the handle portion 44B of the press-contact screw 42 and rotating this in a clockwise direction when screwing the press-contact screw 42 into the screw hole 41, a rotation of the inner cylinder 44 is transmitted by the clutch mechanism 45 to the outer cylinder 43 and the press-contact screw 42 is screwed into the screw hole 41 in a state where no load has been applied to the screw hole 41 (outer cylinder 43). On the other hand, when a load is applied in the inserting direction, that is, to screwing, of the press-contact screw 41, the clutch mechanism 45 avoids a rotation of the inner cylinder 44 from being transmitted to the outer cylinder 43 to restrict the press-contact screw 42 from being screwed into the screw hole 41.

<Construction of Stand 50>

Figure 7:
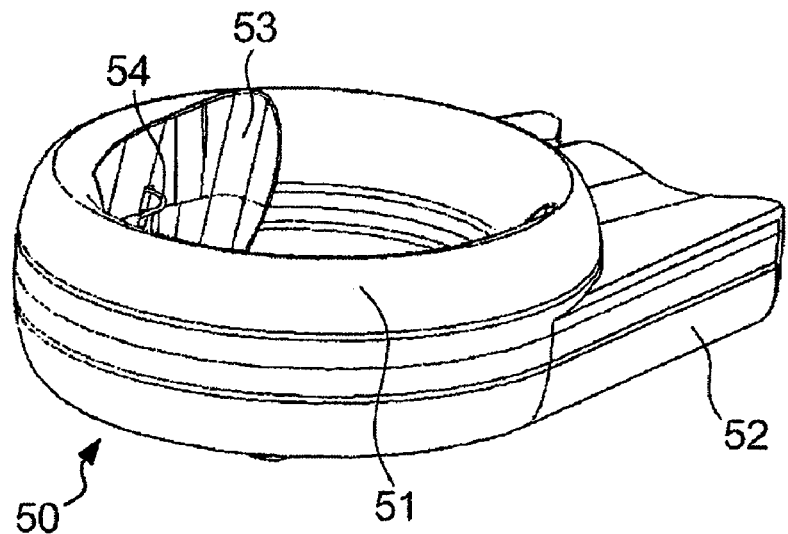
FIG. 7 is a perspective view showing a stand according to the embodiment.

Next, a description will be given of a construction of the stand 50 while referring to FIG. 7 and FIG. 8. FIG. 7 is a perspective view of the stand 50, and FIG. 8 is a top view of a state where the stand 50 is attached to the holder 20, viewed from above the player 100.

The stand 50 has an annular holder support portion 51 and a leg portion 52 formed in a projecting manner radially outside the holder support portion 51.

At the inner circumferential side of the holder support portion 51, holder guide grooves 53, 53 (only one is shown) formed in a separated manner in the direction perpendicular to the direction in which the leg portion 52 extends are formed obliquely to the axis line of the holder support portion 51, and in the holder guide groove 53, a feeding terminal 54 to be connected to the receiving terminal 25 of the holder 20 in a state where the holder 20 is attached is provided so as to be extendable and retractable at a predetermined spring force.

Figure 8:
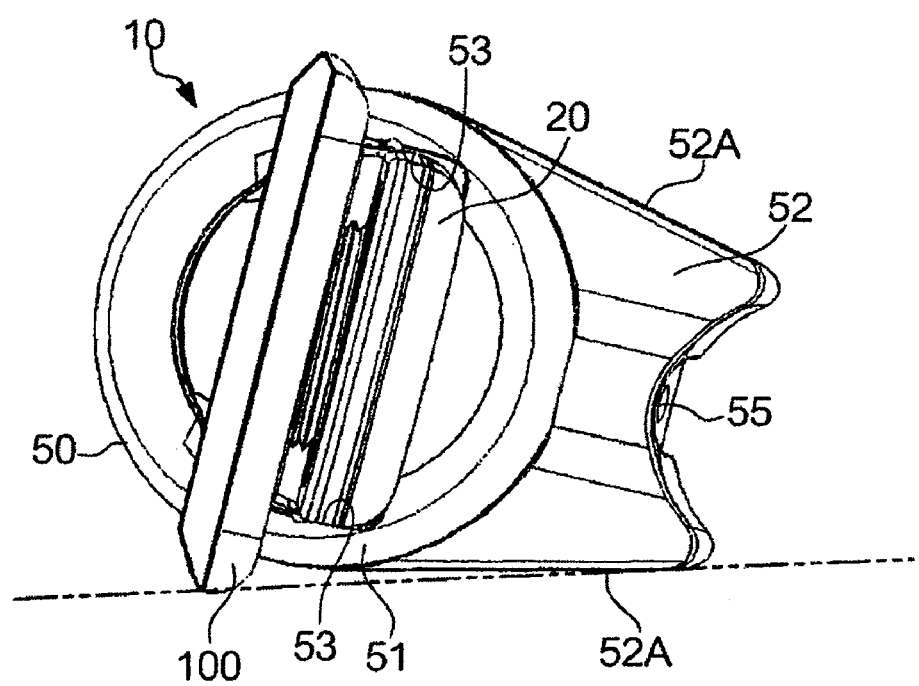
FIG. 8 shows a state where the stand is attached to the holder.

The leg portion 52 is, as shown in FIG. 8, formed in a substantially trapezoidal shape, whose side surfaces 52A, 52A are in a tapered shape where the width dimension is reduced toward the tip. In addition, a female plug 55 to be directly fed with power from a charging adapter via a lead and a male plug (neither is shown) is formed at its upper base part. The female plug 55 is electrically connected to the feeding terminal 54.

<Setting Operation of Holder 20>

Figure 9:
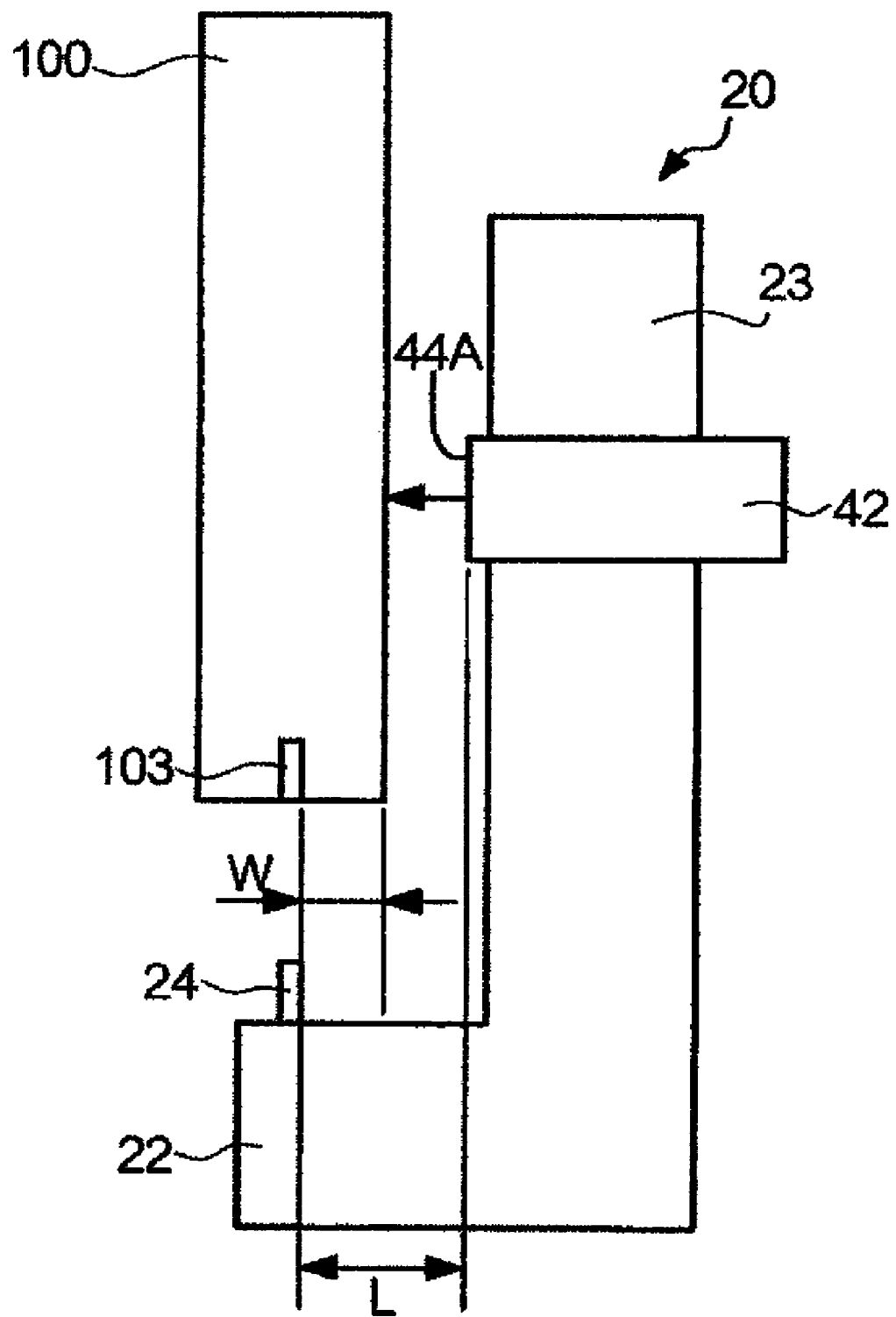
FIG. 9 schematically shows a dimensional relationship between the holder and a player.
Figure 10:
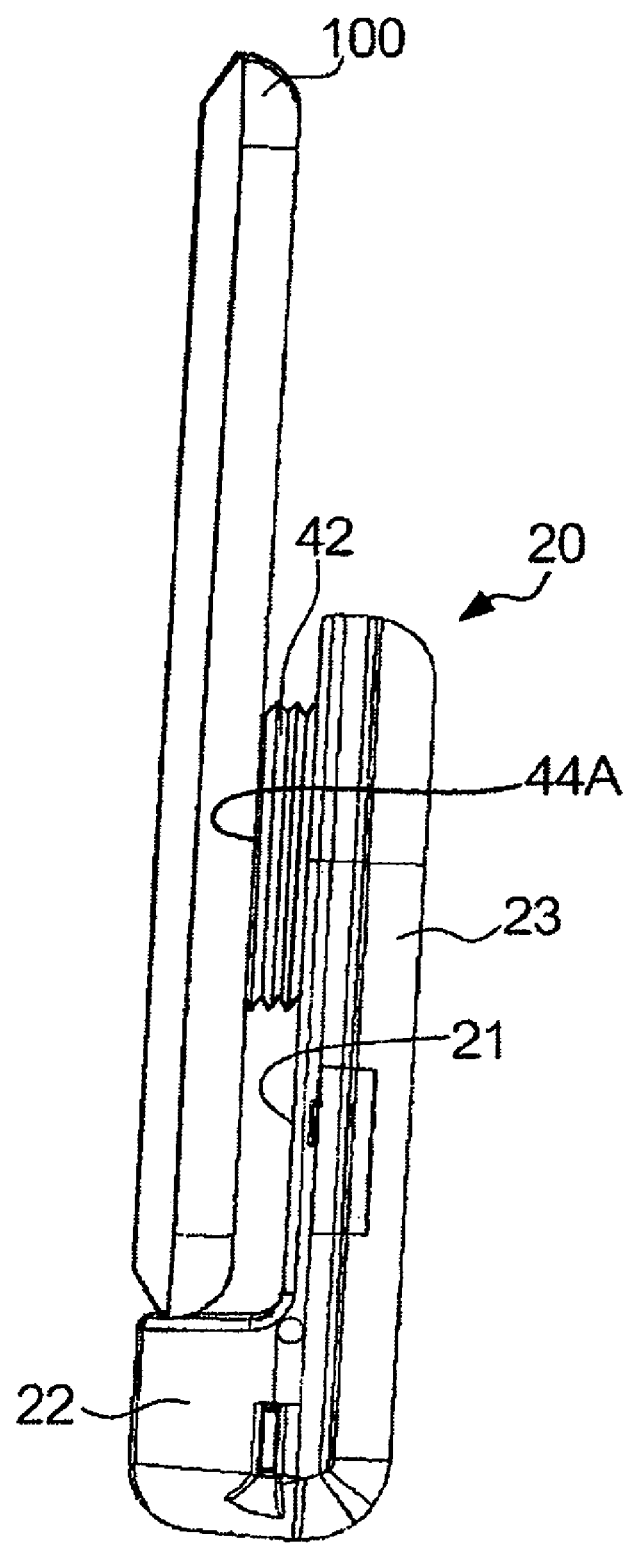
FIG. 10 is a side view showing a state where the player is connected to and placed on the holder.

Next, a description will be given of the operation when the player 100 is connected to the holder 20 according to the present embodiment while referring to the figures. FIG. 9 schematically shows a dimensional relationship between the holder 20 and the player 100, and FIG. 10 is a side view showing a state where the player 100 is connected to the holder 20.

This setting operation is, as shown in FIG. 9, for screwing the press-contact screw 42 to adjust a distance L so that the expression L≈W is satisfied, where the distance from the apparatus-side connector 103 of the player 100 to the surface opposing the back portion 23 is W, and the distance from the holder-side connector 24 to the press-contact portion 44A is L.

First, a user retracts the press-contact screw 42 to such an extent that the press-contact portion 44A thereof does not project from the back portion 23, and connects the apparatus-side connector 103 to the holder-side connector 24 in order to connect and place the player 100 to and on the placing portion 21 of the holder 20. In this case, the player 100 has not been fixed to the holder 20 or is in a fixing relationship by only a connector engagement, and thus results in an unstable state. The user therefore holds the player 100 in a state perpendicular to the base portion 22, and then pinches the handle portion 44B of the press-contact screw 42 and rotates the handle portion 44B in the clockwise direction to screw the press-contact screw 42 into the screw hole 41. This makes the press-contact portion 44A of the press-contact screw 42 project from the back portion 23 so as to approach the back surface of the player 100.

At a stage where the press-contact portion 44A of the press-contact screw 42 has been pressed to contact the back surface of the player 100, a load is applied to the outer cylinder 43, and the clutch mechanism 45 avoids connection between the outer cylinder 43 and the inner cylinder 44 and the inner cylinder 44 rotates idle to restrict screwing of the press-contact screw 42. This allows, as shown in FIG. 10, regulating the press-contact screw 42 to a predetermined position (that is, L≈W) so as to set the player 100 into a state perpendicular to the base portion 22.

<Operation of Holder 20>

As a result of connecting the player 100 to the holder 20 according to the present embodiment, the holder 20 electrically connects the apparatus-side connector 103 and the holder-side connector 24. As a result, the wireless transmission circuit integrated in the holder 20 is driven by receiving power fed from the secondary battery of the player 100 to transmit data stored in the memory of the player 100 to an external apparatus (for example, a speaker and the like) by wireless communication. In this case, because the holder 20 and the player 100 are carried and manipulated in an integrated manner, the player 100 can manipulate the external apparatus as if it were a player having a wireless communications function or a remote controller.

In addition, because the wireless transmission circuit has a function of lighting up the green LED 26G when the transmission is satisfactory and lighting up the red LED 26R when an error has occurred, this informs the user of the state of wireless communications.

Also, when there is external power feeding via the female plug 55 of the stand 50 or external power feeding via a power feeding connector in the concealing cover 27 to the holder 20 for charging the player 100, the wireless transmission circuit may be driven by the external power feeding. In this case, it suffices to constitute a circuit to determine whether external power feeding exists by the electronic element 31 mounted on the substrate 30. In addition, power feeding sources may be switched over at the user's will.

Moreover, attaching the holder 20 (connecting apparatus body) attached with the player 100 to the stand 50 makes it possible to install the display portion 101 in a vertically long state or a horizontally long state.

More specifically, because the holder guide groove 53 of the stand 50 is formed in an inclined manner with respect to the axis line of the holder support portion 51, when the holder 20 is attached so as to lie along the holder guide groove 53 of the stand 50, with the display portion 101 installed in a vertically long state, as shown in FIG. 1, the underside of the stand 50 is grounded, and the upper side is held in a state inclined backward. On the other hand, when the display portion 101 is installed in a horizontally long state, as shown in FIG. 8, one of the side surfaces 52A of the leg portion 52 in a tapered shape is grounded, and the upper side is held in a state inclined backward. This enables the player 100 to be in a vertically placed state/a horizontally placed state, thereby making the display portion 101 easily visible to the user.

Further, when the player 100 having a function, according to whether the display portion 101 is in a vertically long state or a horizontally long state, of automatically switching over its display to a vertically long display or a horizontally long display is connected to the attachment 10 according to the present embodiment, simply transposing the attachment 10 into a vertically mounted state or a horizontally mounted state makes it possible to switch over the vertically long display and the horizontally long display of the display portion 101.

Operation and Effect of the Present Embodiment

In the holder 20 according to the present embodiment, adjusting the press-contact portion 44A of the press-contact screw 42 into a state pressed against the back surface of the player 100 by means of the positioning mechanism 40 as described in the aforementioned setting operation allows holding the player 100 in a state perpendicular to the base portion 22. By fixing the player 100 to the holder 20, application of an unnecessary load to the connector can be prevented, damage to the connectors can also be prevented by reliably connecting the connectors to each other, and moreover, reliability of the holder 20 can be improved.

Moreover, even when a player 100 different in outside dimensions (thickness dimension) is connected to and placed on the holder 20, performing the aforementioned setting operation makes it possible to use the holder 20 in common for the player 100 different in shape. Moreover, the positioning mechanism 40 once set no longer requires adjustment when connecting and placing the same player 100, so that user usability can be improved.

Because the press-contact screw 42 includes the clutch mechanism 45 for restricting the press-contact screw 42 from being screwed at a stage where the press-contact portion 44A has been pressed to contact the player 100, this allows inhibiting application of an excessive force to the player 100 from the press-contact screw 42, and the player 100 can be protected.

Moreover, because the press-contact portion 44A is pressed to contact the back surface to be at the opposite side of the manipulator 102 of the player 100 at almost the same position as a height position in the longitudinal direction of the rectangular shape, when the player 100 is manipulated by the user in a state connected to the holder 20, the player 100 is efficiently prevented from moving in response to a pressing manipulation operation, so that operability can be improved.

<Modifications>

Although an exemplary embodiment of the present invention has been described in the above, the present invention can be carried out in other various modes without being limited to the foregoing embodiment. For example, the foregoing embodiment may be modified as in the following to carry out the present invention.

<Modification 1>

In the above-mentioned embodiment, a case where the positioning unit includes the screw hole 41, the press-contact screw 42, and the clutch mechanism 45 has been exemplified. However, the present invention is not limited thereto, and can be carried out in various forms.

<Modification 1-1>

The positioning unit may be composed of the screw hole 41 and the press-contact screw 42, and the screwing restricting unit (clutch mechanism 45) may be eliminated.

In the above-mentioned clutch mechanism 45, the engagement teeth row 43B is formed on the outer cylinder 43 and the engagement claw 44E is provided on the inner cylinder 44, that is, a recessed engaging portion is formed on the outer cylinder 43 and a projected engaged portion is formed on the inner cylinder 44, however, a clutch mechanism may be composed of a projected engaging portion formed on the outer cylinder 43 and a recessed to-be-engaged portion formed on the inner cylinder 44.

<Modification 1-2>

A positioning unit may be composed of a through-hole, an insertion shaft, and an insertion restricting unit.

Figure 11:
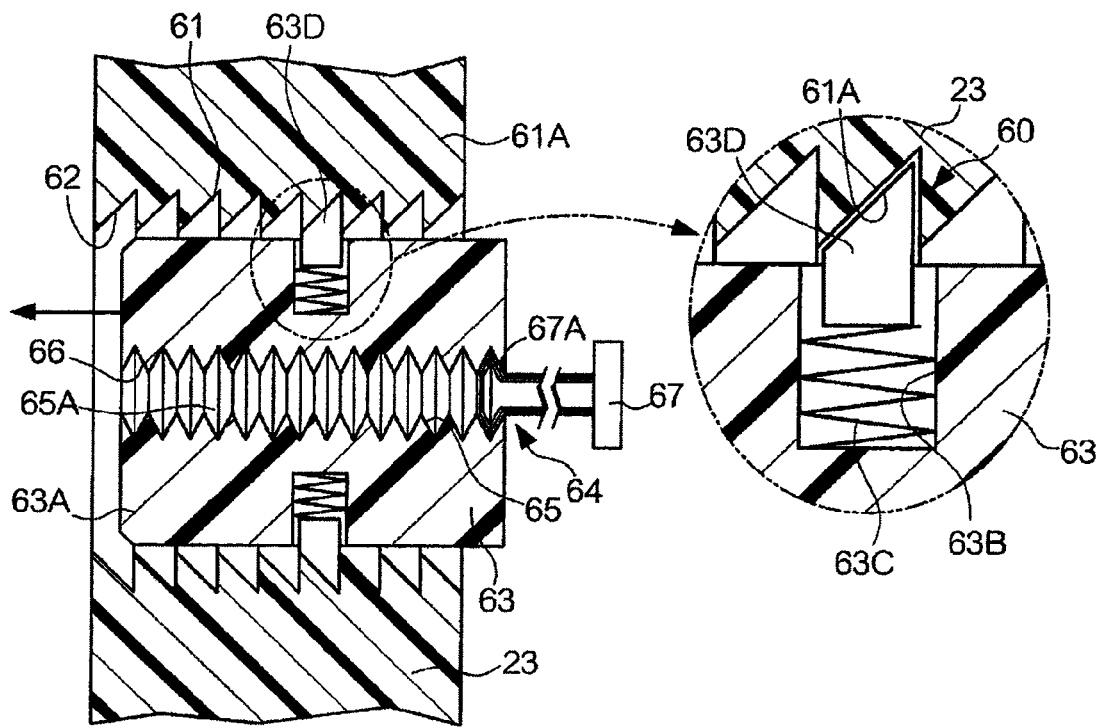
FIG. 11 is a sectional view showing the positioning mechanism according to Modification 1-2.

Concretely, the positioning unit, like a positioning mechanism 60 shown in FIG. 11, includes a through-hole 62 opened in the back portion 23 and provided with an annular groove group 61 of a plurality of annular grooves 61A formed at its inner circumferential surface, an insertion shaft 63 which is provided with an engagement claw 63D to be inserted in the through-hole 62 and engaged with the annular groove group 61 and whose press-contact portion 63A at its head is extending toward a surface opposing the back portion of the portable electronic apparatus, and an insertion restricting mechanism 64 for restricting, at a stage where the press-contact portion 63A of the insertion shaft 63 has been pressed to contact the back surface side of the player 100, the insertion shaft 63 from being pushed further in.

The engagement claw 63D is inserted, in each of the housing holes 63B formed at positions opposed in the diametrical direction of the insertion shaft 63 to have rectangular shapes in section opened to the outer circumferential side, along with an urging spring 63C.

The annular groove 61A is formed to have a right-angled triangular sectional shape whose hypotenuse is inclined with respect to the inserting direction (arrow) of the insertion shaft 63, and the engagement claw 63D also has a shape of a tooth form to be engaged with the annular groove 61A.

Further, in the insertion shaft 63, the insertion restricting mechanism 64 is provided, and the insertion restricting mechanism 64 has a communication hole 66 opened in the axial direction of the insertion shaft 63 and having an annular groove group 65 of a plurality of annular grooves 65A formed at its inner circumferential surface and a pressing rod 67 inserted in the communication hole 66 and formed at its tip as a spring portion 67A to be increased in diameter. The annular groove 65A is formed to have an isosceles triangular sectional shape, and the spring portion 67A also has a shape to be engaged with the annular groove 65A.

In the positioning mechanism 60 constructed as such, by pressing the pressing rod 67 in the arrow direction, because the spring force of the spring portion 67A is greater than that of the urging spring 63C, the engagement claw 63D is pushed into the housing hole 63B against the spring force of the urging spring 63C, so that the press-contact portion 63A moves in the arrow direction.

At a stage where the press-contact portion 63A has contacted the side surface of the player 100, the spring portion 67A of the pressing rod 67 is reduced in diameter to move within the communication hole 66 in the arrow direction, thereby avoiding a pressing motion of the pressing rod 67 from being transmitted to the insertion shaft 63.

Also in the positioning mechanism 60 constructed as such, in the same manner as in the embodiment, a setting operation for the player 100 can be performed at the holder 20.

The positioning mechanism 60 may be composed of the through-hole 62 and the insertion shaft 63 by elimination of the insertion restricting mechanism 64.

In the positioning mechanism 60 and the insertion restricting mechanism 64, the engaging portion and to-be-engaged portion may be formed vice versa in terms of the recessed and projected shapes thereof.

<Modification 1-3>

Figure 12:
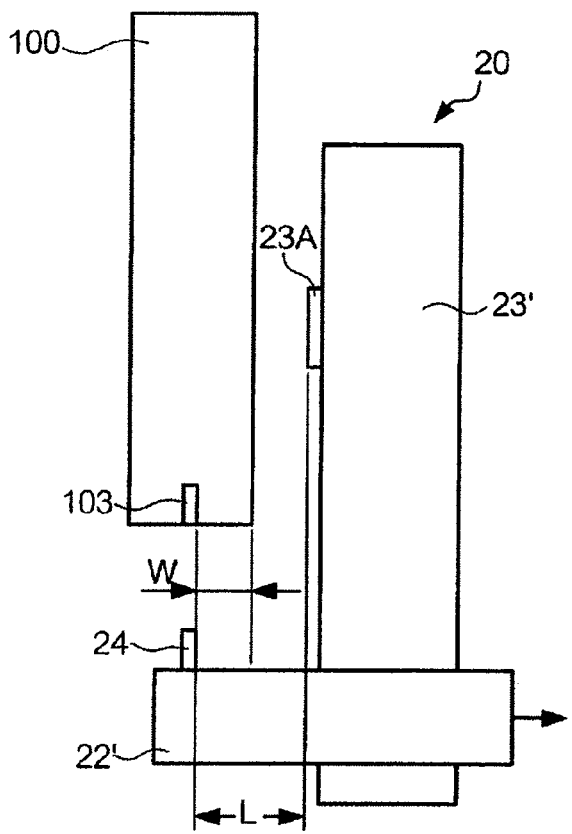
FIG. 12 schematically shows the construction according to Modification 1-3.

In the above-mentioned embodiment and modifications, a description has been given of a positioning unit that adjusts the player 100 from the back portion 23 by means of the press-contact portion, however, the present invention is not limited thereto, and a base portion 22' may be made movable with respect to a back portion 23', as shown in FIG. 12.

In this case, by moving the base portion 22' in the arrow direction, the back surface of the player 100 placed on the base portion 22' is pressed against a fixed press-contact portion 23A formed on the back portion 23'. The player 100 is thereby fixed in a state perpendicular to the base portion 22'.

Further, a movement restricting unit for restricting the base portion 22' from moving further at a stage where a tip of the press-contact portion 23A has been pressed to contact the player 100 may be provided.

Further, for the present invention, the structure of the embodiment and the structure of Modification 1-3 may be combined, and the structure of Modification 1-2 and the structure of Modification 1-3 may be combined.

<Modification 2>

In the above-mentioned embodiment, a case where a wireless transmission circuit is constituted by the electronic element 31 mounted on the substrate 30 has been exemplified, however, the present invention is not limited thereto, and as a matter of course, it may be possible to form a charging circuit, form both a wireless transmission circuit and a charging circuit, and to further form another circuit.

<Modification 3>

In the above-mentioned embodiment, the player 100 to be connected to the holder 20 is limited to a player having an apparatus-side connector that can be connected to the holder-side connector 24, however, making the holder-side connector 24 replaceable makes it also possible to place players having various apparatus-side connectors.

In the above-mentioned embodiment and modifications, description has been given of a portable music player as an example of the portable electronic apparatus, however, the present invention is by no means limited thereto, and the connecting apparatus according to the present invention can also be connected with a mobile phone, a digital camera, a PDA (personal digital assistant), or the like, and moreover, common usage beyond the types of portable electronic apparatuses also becomes possible.

In the connecting apparatus, the positioning unit may have a press-contact portion provided in the back portion so as to be movable from the back portion toward the holding space.

In the connecting apparatus, the positioning unit may further include a pressing restricting unit which restricts, at a stage where the press-contact portion is pressed to contact the electronic apparatus, the press-contact portion from being further pressed against the electronic apparatus.

In the connecting apparatus, the positioning unit may have: a screw hole opened in the back portion; and a screw which is screwed into the screw hole and whose head extends toward the holding space.

In the connecting apparatus, the positioning unit may further include a screwing restricting unit which restricts, at a stage where the head of the screw is pressed to contact the electronic apparatus, the screw from being further screwed in the screw hole.

In the connecting apparatus, the positioning unit may have: a through-hole which is opened in the back portion and is provided with an engaging portion on an inner circumferential surface of the through-hole; and an insertion shaft which is inserted in the through-hole, which is provided with an engaged portion to be engaged with the engaging portion, and whose head extends toward the holding space.

In the connecting apparatus, the positioning unit may further include an insertion restricting unit which restricts, at a stage where the head of the insertion shaft is pressed to contact the electronic apparatus, the insertion shaft from being further inserted in the through-hole.

In the connecting apparatus, the positioning unit may have: a press-contact portion provided in a projecting manner on the back portion; and a base moving unit which moves the base portion with respect to the back portion in a direction in which the connector of the connecting apparatus approaches the back portion.

In the connecting apparatus, the positioning unit may further include a movement restricting unit which restricts, at a stage where a head of the press-contact portion is pressed to contact the electronic apparatus, the base portion from moving further.

In the connecting apparatus, the positioning unit may have: a press-contact portion provided in the back portion so as to be movable from the back portion toward the holding space; and a base moving unit which moves the base portion with respect to the back portion in a direction in which the connector of the connecting apparatus approaches the back portion.

In the connecting apparatus, the positioning unit may further include a movement restricting unit which restricts, at a stage where a head of the press-contact portion is pressed to contact the electronic apparatus, the base portion from moving further.

In the connecting apparatus, the positioning unit may further include a pressing restricting unit which restricts, at a stage where the press-contact portion is pressed to contact the electronic apparatus, the press-contact portion from being further pressed against the electronic apparatus.

In the connecting apparatus, the predetermined position may be a position where the portable electronic apparatus is substantially perpendicular to the base portion.

In the connecting apparatus, the positioning unit may adjust, where a distance from the connector of the electronic apparatus to a surface of the electronic apparatus opposing the back portion is W and a distance from the connector of the connecting apparatus to a head of the press-contact portion is L, the distance L so that the expression $L \approx W$ is satisfied.

In the connecting apparatus, the body may include a substrate mounted with an electronic element, and the connector of the connecting apparatus is electrically connected to the substrate.

In the connecting apparatus, a wireless transmission circuit may be constituted by the electronic element, and the wireless transmission circuit may be driven by electric power received from the electronic apparatus.

In the connecting apparatus, a wireless transmission circuit may be constituted by the electronic element, and the wireless transmission circuit may be, when externally fed with electric power, driven by the electric power, and be driven by electric power received from the electronic apparatus when not externally fed with electric power.

In the connecting apparatus, a charging circuit may be constituted by the electronic element, and the charging circuit may be driven by externally fed electric power.

In the connecting apparatus, the connector of the connecting apparatus provided on the base portion may be replaceable.

What is claimed is:

1. A connecting apparatus for connecting to an electronic apparatus including a connector, the connecting apparatus comprising:
   a body that includes a base portion and a back portion substantially perpendicular to each other so as to define a holding space for holding the electronic apparatus;

a connector provided on the base portion, and to be connected with the connector of the electronic apparatus; and a positioning unit which adjusts the electronic apparatus to a predetermined position with respect to the base portion in a state where the connector of the electronic apparatus is connected to the connector of the connecting apparatus, wherein the positioning unit has:

a screw hole opened in the back portion; and a screw which is screwed into the screw hole and whose head extends toward the holding space.

2. The connecting apparatus according to claim 1, wherein the positioning unit further includes a screwing restricting unit which restricts, at a stage where the head of the screw is pressed to contact the electronic apparatus, the screw from being further screwed in the screw hole.

3. The connecting apparatus according to claim 1, wherein the connector of the connecting apparatus provided on the base portion is replaceable.

4. The connecting apparatus according to claim 1, wherein the positioning unit has a press-contact portion provided in the back portion so as to be movable from the back portion toward the holding space.

5. The connecting apparatus according to claim 4, wherein the positioning unit further includes a pressing restricting unit which restricts, at a stage where the press-contact portion is pressed to contact the electronic apparatus, the press-contact portion from being further pressed against the electronic apparatus.

6. The connecting apparatus according to claim 1, wherein the predetermined position is a position where the portable electronic apparatus is substantially perpendicular to the base portion.

7. The connecting apparatus according to claim 6, wherein the positioning unit adjusts, where a distance from the connector of the electronic apparatus to a surface of the electronic apparatus opposing the back portion is W and a distance from the connector of the connecting apparatus to a head of the press-contact portion is L, the distance L so that the expression L≈W is satisfied.

8. The connecting apparatus according to claim 1, wherein the body includes a substrate mounted with an electronic element, and the connector of the connecting apparatus is electrically connected to the substrate.

9. The connecting apparatus according to claim 8, wherein a wireless transmission circuit is constituted by the electronic element, and the wireless transmission circuit is driven by electric power received from the electronic apparatus.

10. The connecting apparatus according to claim 8, wherein a wireless transmission circuit is constituted by the electronic element, and the wireless transmission circuit is, when externally fed with electric power, driven by the electric power, and is driven by electric power received from the electronic apparatus when not externally fed with electric power.

11. The connecting apparatus according to claim 8, wherein a charging circuit is constituted by the electronic element, and the charging circuit is driven by externally fed electric power.

12. A connecting apparatus for connecting to an electronic apparatus including a connector, the connecting apparatus comprising:

a body that includes a base portion and a back portion substantially perpendicular to each other so as to define a holding space for holding the electronic apparatus;

a connector provided on the base portion, and to be connected with the connector of the electronic apparatus; and a positioning unit which adjusts the electronic apparatus to a predetermined position with respect to the base portion in a state where the connector of the electronic apparatus is connected to the connector of the connecting apparatus, wherein the positioning unit has:

a through-hole which is opened in the back portion and is provided with an engaging portion on an inner circumferential surface of the through-hole; and an insertion shaft which is inserted in the through-hole, which is provided with an engaged portion to be engaged with the engaging portion, and whose head extends toward the holding space.

13. The connecting apparatus according to claim 12, wherein the positioning unit further includes an insertion restricting unit which restricts, at a stage where the head of the insertion shaft is pressed to contact the electronic apparatus, the insertion shaft from being further inserted in the through-hole.

14. A connecting apparatus for connecting to an electronic apparatus including a connector, the connecting apparatus comprising:

a body that includes a base portion and a back portion substantially perpendicular to each other so as to define a holding space for holding the electronic apparatus;

a connector provided on the base portion, and to be connected with the connector of the electronic apparatus; and a positioning unit which adjusts the electronic apparatus to a predetermined position with respect to the base portion in a state where the connector of the electronic apparatus is connected to the connector of the connecting apparatus, wherein the positioning unit has:

a press-contact portion provided in a projecting manner on the back portion; and a base moving unit which moves the base portion with respect to the back portion in a direction in which the connector of the connecting apparatus approaches the back portion.

15. The connecting apparatus according to claim 14, wherein the positioning unit further includes a movement restricting unit which restricts, at a stage where a head of the press-contact portion is pressed to contact the electronic apparatus, the base portion from moving further.

16. A connecting apparatus for connecting to an electronic apparatus including a connector, the connecting apparatus comprising:

a body that includes a base portion and a back portion substantially perpendicular to each other so as to define a holding space for holding the electronic apparatus;

a connector provided on the base portion, and to be connected with the connector of the electronic apparatus; and a positioning unit which adjusts the electronic apparatus to a predetermined position with respect to the base portion in a state where the connector of the electronic apparatus is connected to the connector of the connecting apparatus, wherein the positioning unit has:

a press-contact portion provided in the back portion so as to be movable from the back portion toward the holding space; and a base moving unit which moves the base portion with respect to the back portion in a direction in which the connector of the connecting apparatus approaches the back portion.

17. The connecting apparatus according to claim 16, wherein the positioning unit further includes a movement restricting unit which restricts, at a stage where a head of the press-contact portion is pressed to contact the electronic apparatus, the base portion from moving further.

18. The connecting apparatus according to claim 16, wherein the positioning unit further includes a pressing restricting unit which restricts, at a stage where the press-contact portion is pressed to contact the electronic apparatus, the press-contact portion from being further pressed against the electronic apparatus.

* * * * *